Nov. 17, 1925.
A. C. KERLEY
PENCIL
Filed Aug. 23, 1923
1,561,725
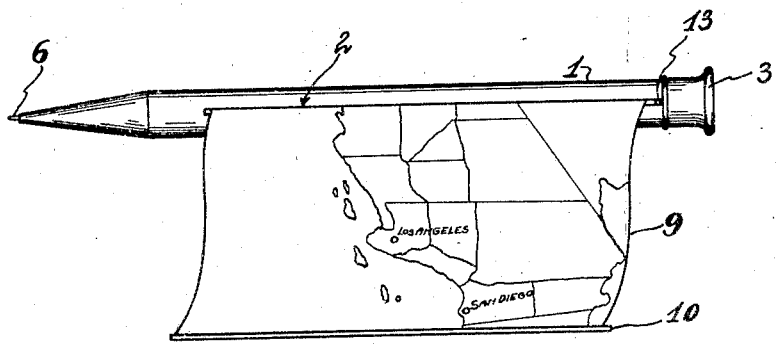
FIG.1
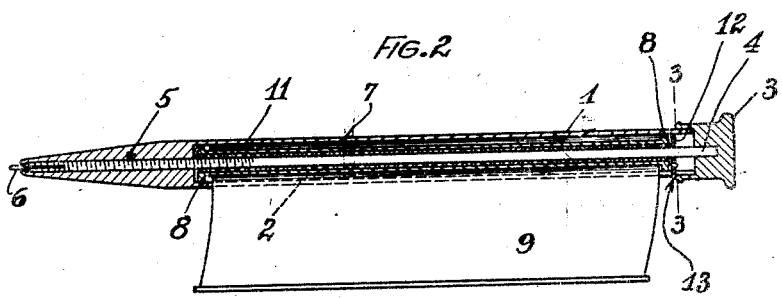
FIG.2
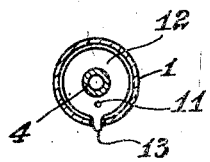
FIG.3
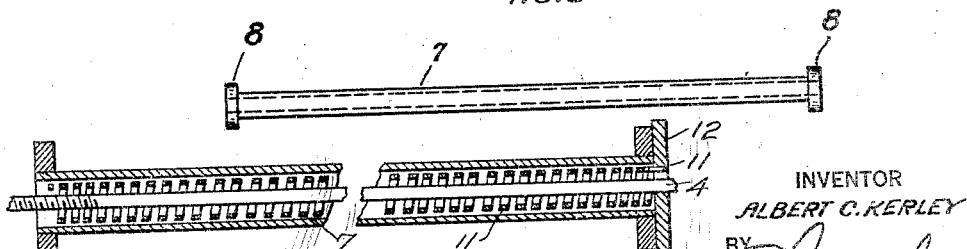
FIG.4
FIG.5
INVENTOR
ALBERT C. KERLEY
BY
ATTORNEY Patented Nov. 17, 1925.

1,561,725

UNITED STATES PATENT OFFICE.

ALBERT C. KERLEY, OF OAKLAND, CALIFORNIA.

PENCIL.

Application filed August 23, 1923. Serial No. 658,913.

*To all whom it may concern:*

Be it known that I, ALBERT C. KERLEY, a citizen of the United States, residing at Oakland, in the county of Alameda and State of California, have invented certain new and useful Improvements in Pencils, of which the following is a specification.

My invention is an improvement in pencils.

The object of my invention is to provide a pencil that will have a map attached to it, which is inexpensive to manufacture and simple in construction.

Only the preferred form of my invention is shown in the drawing, and I wish to have it understood that the map can also be used to have advertising matter or useful information, such as computation tables printed on it.

In the annexed drawing in which my invention is illustrated:

Figure 1 is a perspective view of my pencil with the map partly drawn out.

Figure 2 is a longitudinal sectional view of my invention.

Figure 3 is a sectional view taken on line 3—3 of Figure 2.

Figure 4 is an outside view of the map roller.

Figure 5 is a sectional detail similar to Figure 2, with the spring 11 and other details shown enlarged.

Referring more particularly to the drawing in which identical parts are denoted by the same symbols in all figures:

My pencil consists of an outer casing 1 with a longitudinal slot 2 provided therein. A cap 3 is fitted over one end of said casing 1 and is provided in the center of the inside thereof with a hole to receive one end of a hollow shaft 4. This shaft screws into a threaded portion 5 at the opposite end of said casing 1 and contains the lead 6.

A map roller 7 is mounted on said shaft 4 and has flanges 8 on both ends. The map 9 is fastened with one end to the roller 7 and with the other end extending through the slot 2 of the casing 1. A rod 10 is attached to the outer edge of the map 9 to serve as a stop when the map is in closed position and as a gripping member to pull the map out.

A spring 11 is provided between the shaft 4 and the roller 7. This spring is fastened with one end to the map roller 7 and with the other end to a plate 12. Said plate 12 has a lip 13 which protrudes through the slot 2 and prevents the plate from turning.

When the map is being pulled out enough tension is created in the spring to roll the map up automatically the moment the gripping member 10 is released.

Having described my invention, I claim:

1. In combination with a pencil, an outside casing, said casing having a longitudinal slot therein, a map within said casing, a roller having said map attached thereto, a plate, a lip formed thereon adapted to protrude through the slot, a shaft extending through said plate and said roller, and means to actuate said roller and map.

2. In combination with a pencil, an outside casing, said casing having a longitudinal slot therein and a threaded aperture formed in one end thereof, a cap adapted to fit over the other end of said casing, a map within said casing, a gripping member on said map, a roller to which said map is attached, a plate, a lip formed thereon and adapted to protrude through the slot, a threaded hollow shaft extending through said plate and said roller into the threaded aperture of said outside casing, and a spring adapted to actuate said roller and map, said spring being fastened with one end to said roller and at the other end to said plate.

In testimony whereof I affix my signature.

ALBERT C. KERLEY.